Figure 1:
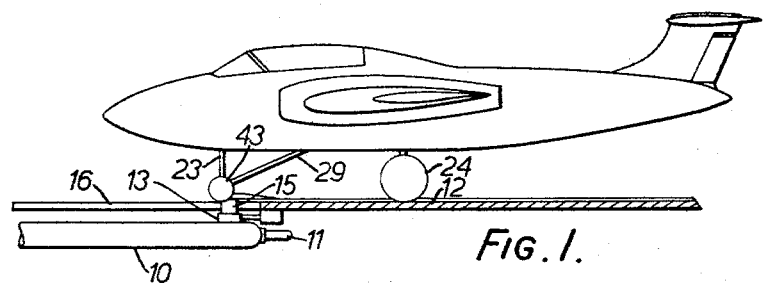

April 13, 1965 S. W. H. WOOD ETAL 3,178,132
AIRCRAFT AND DEVICES FOR LAUNCHING SAME
Filed Nov. 27, 1963 5 Sheets-Sheet 1

INVENTORS
SIDNEY W. H. WOOD +
BY DENNIS G. BRIDGES

ATTORNEYS

April 13, 1965     S. W H. WOOD ETAL     3,178,132
AIRCRAFT AND DEVICES FOR LAUNCHING SAME Filed Nov. 27, 1963     5 Sheets-Sheet 2

INVENTORS
SIDNEY W. H. WOOD &
BY DENNIS G. BRIDGES

Reynolds & Christensen
ATTORNEY

April 13, 1965   S. W H. WOOD ETAL   3,178,132
AIRCRAFT AND DEVICES FOR LAUNCHING SAME
Filed Nov. 27, 1963   5 Sheets-Sheet 3

INVENTORS
SIDNEY W. H. WOOD +
BY DENNIS G. BRIDGES

Reynolds + Christman
ATTORNEY

April 13, 1965     S. W. H. WOOD ETAL     3,178,132
AIRCRAFT AND DEVICES FOR LAUNCHING SAME
Filed Nov. 27, 1963     5 Sheets-Sheet 5

INVENTORS
SIDNEY W. H. WOOD &
BY DENNIS G. BRIDGES

Reynolds & Christensen
ATTORNEY

United States Patent Office 3,178,132
Patented Apr. 13, 1965

3,178,132
AIRCRAFT AND DEVICES FOR
LAUNCHING SAME
Sidney William Henry Wood and Dennis Gilbert Bridges,
Cheltenham, England, assignors to Dowty Rotol Limited, Gloucester, England, a British company
Filed Nov. 27, 1963, Ser. No. 326,481
Claims priority, application Great Britain, Dec. 6, 1962,
46,108/62; May 1, 1963, 17,206/63
9 Claims. (Cl. 244—63)

This invention is concerned with an improved power operated launching system for aircraft and with an aircraft nosewheel mounting for use in the launching system.

A known launching system employed on aircraft carriers includes a steam catapult having one or more cylinders installed below deck and one or more pistons arranged to accelerate a shuttle along the deck, while the aircraft has attachment points for the ends of a bridle, which hooks centrally over the shuttle and through which the launching load is exerted, and a further attachment point for a hold-back strop whose other end is attachable to the deck, the strop having in its length a weak link which is sufficiently strong to restrain the aircraft against engine thrust alone but which will break under the added tensional load applied by the steam catapult.

According to one aspect of the invention, an aircraft launching system comprises an aircraft nosewheel mounting which is extended downwardly to be engageable from behind, rather than from ahead, by a movable member of power-operated launching mechanism, the nosewheel mounting and the movable member having co-operable elements which connect the former to the latter during the application of launching thrust and which are separable when the movable member reaches the end of its launching stroke. There are known aircraft launching systems wherein a tow bar is inclined forwardly and downwardly from the nosewheel mounting to a launching shuttle that projects slightly above the deck, and the launching load is exerted through this tow bar; the tow bar is, of course, releasably connected to the nosewheel mounting. Unless the line of force along the tow bar passes through the center of gravity of the aircraft, a tilting moment causes change in the pitch angle of the aircraft during launching. Various types of aircraft will of necessity use a given launching system at different times, hence such a tilting moment will occur frequently, and must be taken into account. If, as is often the case, the angle of the tow bar extends above the aircraft's center of gravity, it gives rise to a downward load component on the tires during the launch, of such value as to substantially exceed the landing load, which latter normally governs the choice and construction of the tires. Under the conditions described the nosewheel tires must be of heavier construction to resist launching loads than is necessary to resist landing loads. This adds to the weight and expense of such tires.

By the present invention there is provided a generally vertical member extending downwardly from the nosewheel mounting into engagement with the shuttle, whereby vertical loads are sustained in the member and by the connection, but are not applied to the nosewheel or wheels.

Such a vertical member, herein shown as coaxial with the leg, must be raised relative to the wheels during landing on the deck, so that the connecting element at its lower end will not strike the deck when the tires yield. Provision to this end is incorporated herein.

A further feature of the invention is the provision of releasable locking mechanism for securing the co-operable connecting elements to prevent separation of the nosewheel mounting from the movable member during run-up of the aircraft engine, a releasable hold-back device for retaining the movable member at the starting end of its launching stroke, and trip means arranged to release the locking mechanism during the launching stroke.

In a previously known launching system the launching force is applied in tension by the bridle to releasable attachment points on the aircraft, whereas by the present invention the launching force is applied to the aircraft by pushing upon the nosewheel mounting.

An aircraft nosewheel mounting for use with power-operated launching mechanism accordingly comprises, as another aspect of the invention, a telescopic leg having a lower leg member from which a downwardly extending member projects, a connecting element which is carried by the downwardly extending member and adapted for engagement from behind by a movable member of the power operated launching mechanism, such as the shuttle, a wheel axle fitting mounted for up and down movement along the axis of the lower leg member and for steering or castering movement about said axis, and a strut attached to the lower leg member at a position which lies within the height of the nosewheel when the wheel axle fitting occupies its raised position for launching, the strut also lying clear of the nosewheel to permit steering and castering movement when the wheel axle fitting occupies its lowered position.

Figure 2:
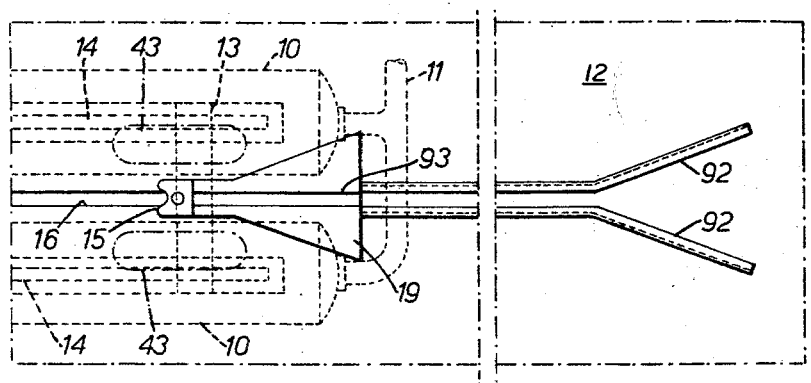
Figure 3:
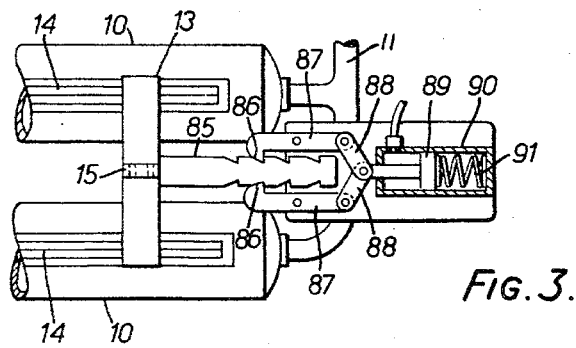
Figure 4:
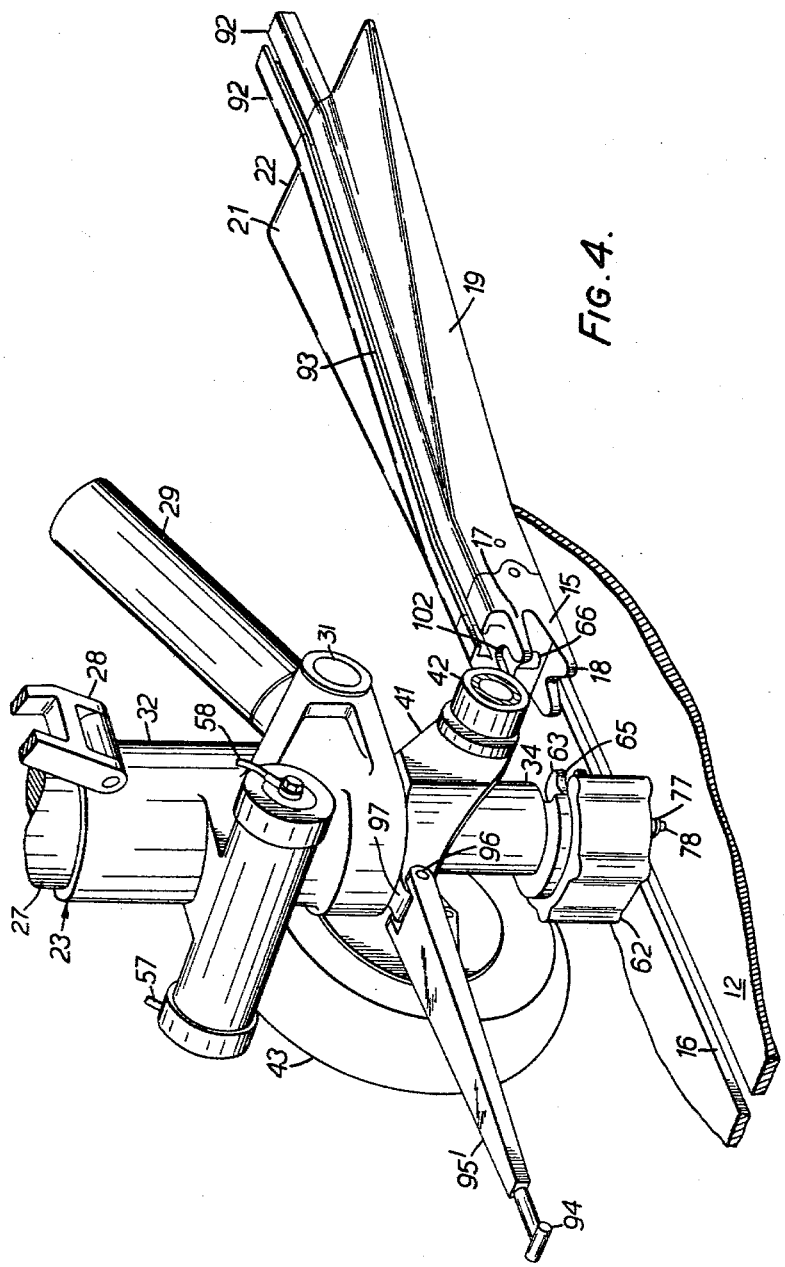
Figure 5:
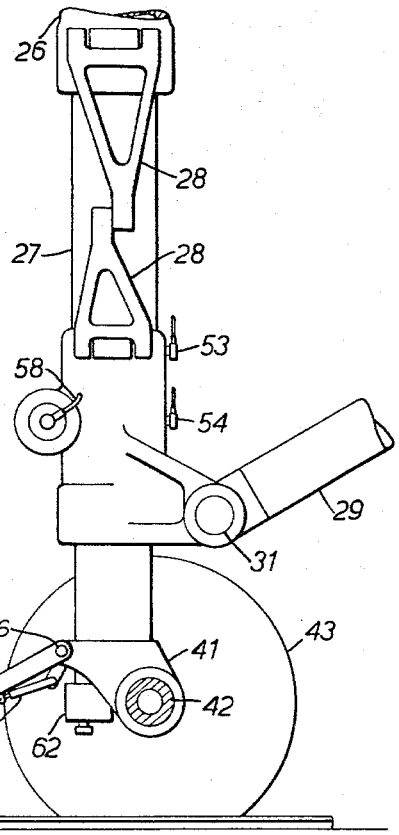
Figure 6:
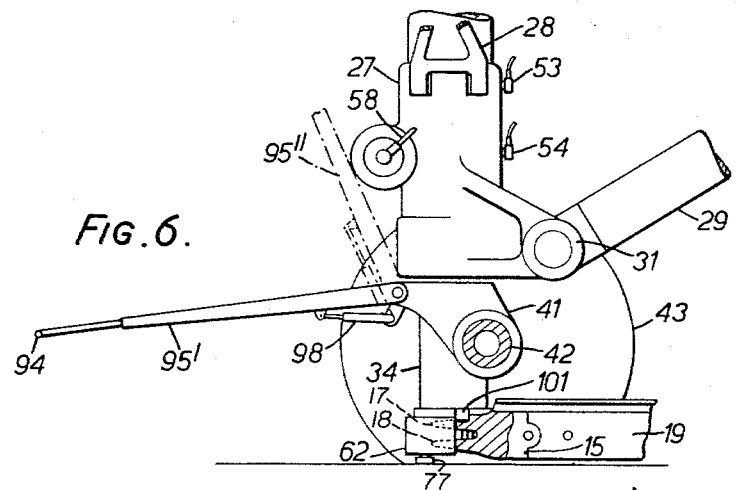
Figure 7:
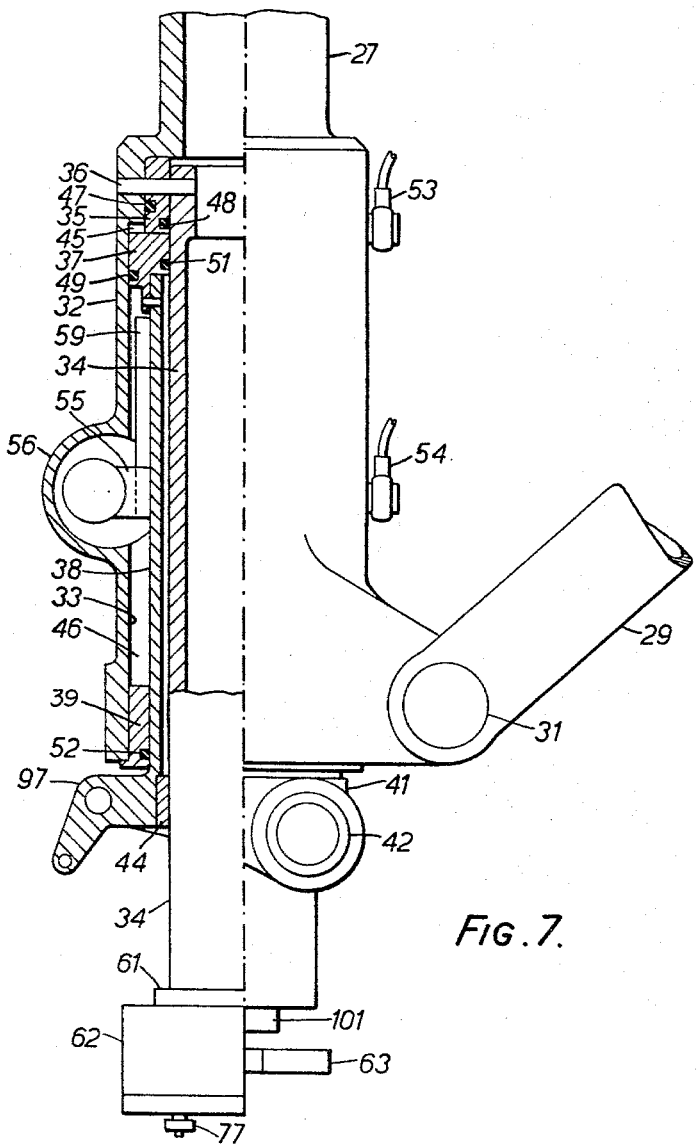
Figure 8:
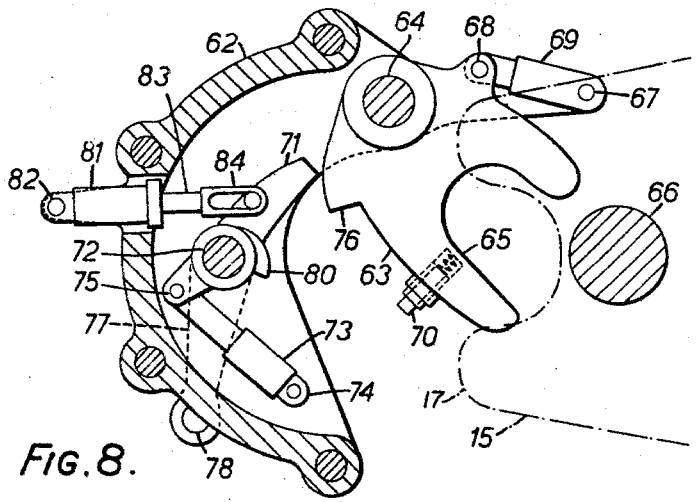
Figure 9:
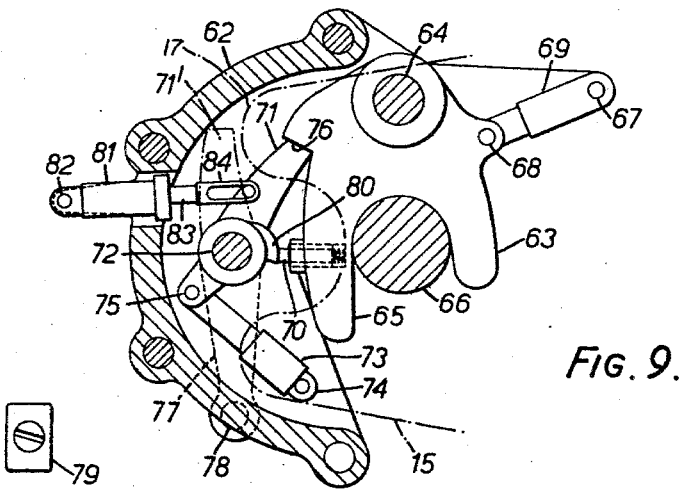

A system for launching aircraft, in accordance with the invention, is illustrated by way of example in the accompanying diagrammatic drawings, of which:

FIGURE 1 shows an aircraft in a position ready for launching from the deck of an aircraft carrier or other ship provided with launching mechanism, FIGURE 2 is a plan view of part of the deck and the launching mechanism on a larger scale than in FIGURE 1, FIGURE 3 shows a below deck view of part of the launching mechanism and the hold-back device, FIGURE 4 is a perspective view of the lower part of the nosewheel mounting of the aircraft and the co-operating parts of the launching mechanism, FIGURE 5 is a side elevation of the lower part of the nosewheel mounting approaching the launching position, FIGURE 6 is a side elevation of the lower part of the nosewheel mounting at the launching position, FIGURE 7 is a side elevation of the lower part of the nosewheel mounting, shown partly in cross-section on one side of the central axis of the mounting, FIGURE 8 is a plan view, partly in section, of locking mechanism having co-operating parts on the lower part of the nosewheel mounting and on the power launching mechanism, and FIGURE 9 shows the parts of FIGURE 8 at a different stage of operation.

Launching mechanism of generally known kind is shown in FIGURES 1, 2 and 4. Two parallel cylinders 10 having a common high pressure steam supply pipe 11 are mounted below the deck 12 with pistons therein. The pistons, not shown, are joined by a transverse connecting piece 13, the ends of which extend through longitudinally extending slots and sealing means 14 in the respective cylinders. Each sealing means which is of known kind is arranged to open in front of, and to close behind, the end of the connecting piece as the piston advances along the cylinder under steam pressure. A member 15, hereinafter called a shuttle, fixed centrally to the connecting piece 13, projects upwardly through a longitudinal slot 16 in the deck 12. The slot 16 lies between and parallel to the cylinders 10.

The shuttle 15 and member 19 attached thereto, hereinafter called a spreader, are provided in this example of launching system to enable certain kinds of aircraft to be launched by the previously known method, though the shuttle 15 alone will enable other kinds of aircraft to be launched by the new method in accordance with the invention.

The shuttle 15 is formed with upper and lower fork arms 17 and 18 for locating the central part of a bridle used in the known launching method, while the spreader 19 is of dovetail shape having a gently inclined ramp surface 21 extending between its transverse rear edge 22 and the shuttle 15, to enable the nosewheel of the aircraft to ride over the shuttle during the known launching method.

The aircraft shown in the example of the present invention has retractable landing gear comprising a telescopic shock-absorbing nosewheel mounting 23, and main landing gear components 24 spaced apart at opposite sides of the aircraft centre line. The nosewheel mounting 23 comprises a leg having an upper member 26, the lower part of which is seen in FIGURE 5, and a telescoping lower member 27 connected to the upper member 26 by torque linkage 28, see also FIGURE 4. A drag strut 29 is upwardly and rearwardly inclined between a pivot 31 on the lower member 27 and a fixed pivot in the aircraft.

The lower portion of the lower leg member 27, FIGURE 7, is formed as a cylinder 32 having an internal bore 33 within which a cylindrical inner member 34 is located concentrically by a spacing ring 35, and is secured by dowels 36. The annular cavity formed between the cylinder 32 and the inner member 34 receives an annular piston 37 which is fixed to an annular piston rod 38. The latter extends through a bearing 39 at the lower end of the bore 33 to an axle fitting 41 which is integral with the piston rod 38 and which carries an axle 42 on which twin wheels 43 are mounted. The axle fitting 41 carries a bearing 44 which slides on the member 34.

The annular piston 37 separates an upper annular chamber 45 between the cylinder 32 and the inner member 34 from a lower annular chamber 46 between the cylinder 32 and the piston rod 38. The upper chamber 45 is made fluid tight by external and internal seals 49 and 51 in the piston 37 and by external and internal seals 47 and 48 in the spacer 35, while the lower chamber 46 is made fluid tight at its lower end by a sealing ring 52 interposed between the bearing 39 and the piston rod 38. Pipe fittings 53 and 54 in the wall of the cylinder 32 provide fluid connection between the chambers 45, 46 and a valve controlled fluid power source, not shown, whereby the piston and axle fitting assembly may be lowered or raised by fluid power for a purpose which will later be described.

The piston 37 and piston rod 38 are also rotatable with respect to the lower leg member 27 by a rack and pinion motor for steering the nosewheels 43. The rack and pinion steering motor will not be described in detail as it is of generally known type, except to say that a toothed rack 55 actuated by a double-acting hydraulic piston is mounted in a transverse cylindrical housing 56 integral with the cylinder 32. Connecting pipes 57 and 58 from the ends of the housing 56 may be connected to a suitable steering control valve, not shown, for fluid power operation of the steering. The toothed rack 55 is in mesh with pinion teeth 59 (FIGURE 7) which are formed on the annular piston rod 38. The teeth 59 are elongated in the axial direction to permit axial sliding movement of the piston rod 38 between end stops and yet to remain in mesh. The end stop to upward movement of the piston 37 is provided by engagement with the spacing ring 35, while the end stop to downward movement is provided by engagement of the bearing 44 with a flange-like abutment 61 at the lower end of the cylindrical member 34.

The lower end of the substantially vertically disposed cylindrical member 34 and the shuttle 15 are adapted to co-operate for launching the aircraft as will now be described. A lock housing 62 is provided below the abutment 61 rigidly attached to the member 34 and opening rearwardly to receive the fork arms 17 and 18 of the shuttle 15, FIG. 6. A catch plate 63 is mounted on an offset pivot 64 in the housing 62 in a position to turn in a plane lying between the upper fork arm 17 and the lower fork arm 18, FIG. 8. The plate 63 has a notch 65 shaped to receive a locking pin 66 which is fixed centrally to the upper and lower fork arms 17, 18. A spring box 69 interposed between a pivot 67 on the lock housing 62 and a pivot 68 on the catch plate 63 is arranged to move over centre with respect to the pivot 64, whereby in the position of FIG. 8 the notch 65 is in position to receive the locking pin 66, and in the position of FIGURE 9, where the fork arms 17, 18 have entered the housing 62, the spring box 69 tends to maintain the catch plate in its engaged position. The catch plate 63 is held positively in the engaged position, wherein the notch 65 extends transversely, by a locking lever 71 which is fixed to a pivot pin 72 mounted in the housing 62. A spring box 73 interposed between a pivot 74 in the housing and a lever arm 75, fixed to the pivot pin 72 and locking lever 71, urges the locking lever 71 to engage a detent 76 on the catch plate 63.

The locking lever 71 is operable in two ways to release the catch plate 63. A lever arm 77 fixed to one end of the pivot pin 72 below the housing 62 carries a downwardly projecting pin 78. This pin 78 is engageable by a striker 79 (FIGURE 9) which is fixed to the deck at a position part of the way along the launching run. The striker 79 trips the lever arm 77, causing the locking lever 71 to disengage the detent 76. The locking lever 71 is retained clear of the catch plate 63, as shown at 71' in FIGURE 9, by a spring-loaded plunger 70 mounted in the catch plate 63 which snaps behind the end of a cam 80 fixed to the locking lever 71. The lock housing 62 is then free to separate from the locking pin 66. In addition, a small hydraulic jack has its cylinder 81 pivoted to the lock housing at 82 and its piston 83 joined by a pin-and-slot lost-motion connection 84 to the locking lever 71. The lost-motion connection does not interfere with operation of the lever 71 by the striker 79, but it is provided for release of the lock by the pilot in case of emergency.

The locking mechanism as shown in FIGURE 9 is arranged to restrain the aircraft during run-up of the engines, and the shuttle 15 in its turn is restrained by holdback mechanism such as is shown diagrammatically in FIGURE 3. A tail 85 extending rearwardly from the centre of the connecting piece 13 has a number of detents 86 on opposite sides, any one pair of which are engageable by pivoted locking levers 87. The locking levers 87 are engaged through the action of toggle links 88 by a piston 89 under the load of a spring 91 seated at one end of the cylinder 90, this cylinder 90 being secured to a stationary anchorage below the deck. The piston 89 is actuated to release the locking levers 87 by the admission of steam pressure to the other end of the cylinder 90. Steam may be admitted to the cylinder by the same valve which admits steam pressure to the cylinders 10, and it is arranged that the piston 89 will only release the locking levers 87 under a steam pressure which is sufficient for launching.

During the application of launching thrust by the steam cylinders 10, the shuttle 15 pushes the nosewheel mounting instead of restraining it, and the thrust is arranged to be applied directly by the shuttle to the upright cylindrical member 34. To this end a cylindrical spigot 101 projects centrally below the member 34 and is engaged by the hemi-cylindrical base of a recess 102 which is formed below the surface of the upper fork arm 17. The engagement of the fork arms 17, 18 within the housing 62 maintains correct vertical registration of the spigot 101 and the recess.

To enable the aircraft to be advanced to the launching position with its nosewheel mounting correctly located, there is provided on the deck a funnel shaped guide and on the aircraft a feeler which co-operates with the guide. The guide comprises two angle sectioned bars 92 each having one flange upright on the deck and the other flange inturned horizontally towards the other bar. The bars have rearmost forwardly convergent portions and in continuance thereof parallel portions. The guide groove provided by the bars 92 is continued by a central groove 93 in the upper surface of the spreader 19 and the shuttle 15, this groove being contiguous with that formed by the bars 92 when the spreader occupies its rearmost position.

The feeler 94, FIGURE 4, which comprises a short cylindrical length shaped to engage under the inturned flanges of the bars 92, is formed on the end of a steering tiller bar 95 (FIGURE 5). This tiller bar turns on a transverse pivot 96 which is fixed in a central lug 97 on the axle fitting 41. A small three-position jack 98 is interposed between the tiller bar 95 and the axle fitting 41. In one position, the jack 98 lowers the tiller bar on to the deck for co-operation with the guide bars 92; see FIGURE 5. In its middle position, the jack 98 maintains the tiller bar 95 partly raised so that it lies clear of the launching mechanism but not high enough to interfere with the cylinder 32 and the drag strut 29 during steering or castoring movement of the nosewheels 43. This middle position is shown at 95' in FIGURE 6. The fully raised position 95" (FIGURE 6) is one into which the tiller bar is turned by the jack 98 for retraction of the nosewheel mounting.

The action of the feeler 94 and guide bars 92 must clearly take place without fluid pressure in any of the pipes 57, 58 leading to the steering motor. This action in the simple form described is a mechanical one on the rotatable axle fitting 41, but it will be evident that the feeler 94 or the tiller bar 95 may be arranged merely to operate a servo valve which controls the rack and pinion steering 55, 59 so that the wheels 43 follow the course led by the feeler 94.

The sequence of operations in launching an aircraft will now be described.

The aircraft is advanced along the deck 12 towards the launching position under its own power. During such taxying, and also during landing, the axle fitting 41 is maintained by pressurizing chamber 45 in its lowered position adjacent the abutment 61, so that the lock housing 62 is well clear of the deck and the wheels 43 lie wholly below the cylinder 32 and the drag strut 29 whereby full castering of the wheels is not obstructed. Before the advance to the launching position, the tiller bar 95 is lowered by the jack 98 from the position 95' so that the feeler 94 engages the deck between the guide bars 92 to align the nosewheel mounting, FIGURE 5.

The advance of the aircraft is stopped, for example by suitably placed chocks, not shown, when the cylindrical member 34 and the lock housing 62 lie just in front of the shuttle 15 in the rearmost position of the latter. The lock housing 62 is then lowered by releasing hydraulic fluid previously trapped in the chamber 45, while fluid enters the chamber 46. With the piston 37 thus adjacent to or engaging the spacing ring 35, FIGURE 7, the lock housing 62 is close to but just clear of the deck, FIGURES 4 and 6, and in position to receive the forked arms 17, 18 of the shuttle 15. The wheels 43 continue to support the load in the leg members 26, 27. The shuttle 15 is then eased forward so that the locking pin 66 causes the catch plate 63 to turn from the free position of FIGURE 8 to the locked position of FIGURE 9. The locking levers 87 are then caused by spring pressure on the piston 89 to engage a suitable pair of detents 86 whereby the aircraft is restrained by the piston 89 and by the locking mechanism when the aircraft engines are run up to take-off thrust.

The tiller bar 98 is fully raised to the position 95" by the jack 98 in preparation for launching. Upon the admission of working steam pressure through the pipe 11 to the cylinder 90 the hold-back force exerted by the locking levers 87 is released whereupon the same steam pressure, within cylinders 10, moves shuttle 15 ahead, and accelerates the aircraft along the deck.

It is to be noted that the point at which the shuttle 15 applies launching thrust to the nosewheel mounting lies below the centre of gravity of the aircraft, which unless restrained would urge the nosewheel upwardly. In consequence the shuttle 15 must hold the nosewheel down during the launching stroke. This function is achieved by the lock housing 62 which together with the spigot 101 constitute a connecting element arranged to receive in locating engagement the forked arms 17 and 18 and recess 102, which latter elements constitute a co-operating connecting element on the movable member of the launching mechanism.

During the launching run, the striker 79 trips the lever 77 to move the locking lever 71 from the detent 76 into the free position 71' where it is retained by the spring loaded plunger 70 engaging the end of the cam 80. At the end of the run when the thrust of the shuttle 15 ceases, the lock housing 62 continues to move forwardly with the rest of the aircraft while the locking pin 66 stays behind, thereby turning the catch plate 63 back to the disengaged position. The catch plate 63 separates the plunger 70, which is mounted upon the catch plate, from the cam 80, allowing the locking lever 71 to be reset by the spring box 73.

It is to be noted that the provision of an axle fitting 41 which is movable along the axis of the leg member 27, enables the pivotal attachment 31 of the drag stay 29 to be brought close to the spigot 101 on which the launching thrust is applied; see FIGURE 6. In this way the bending moment applied to the cylindrical member 34 by the high launching thrust is kept to a minimum.

After the aircraft has been launched, the undercarriage will then be retracted. Prior to landing, the undercarriage is extended and the axle fitting 41 is moved to its lowered position, as in FIGURE 5, by the admission of hydraulic fluid under pressure to the chamber 45 through the pipe fitting 53. This insures that the lock housing 62 is elevated well above the deck, even when the tires 43 yield under landing forces.

In the example of the invention described, the movable member of the launching mechanism is constructed as a shuttle with a leading forked portion capable of locating a bridle for launching older types of aircraft not constructed for launching by the system in accordance with the invention. If the movable member is not required to be capable of locating a bridle, a modified construction of the connecting elements can be adopted in which height of the movable member above the deck is reduced since it no longer has to be formed with a leading fork shaped portion.

We claim as our invention:

1. An aircraft launching system comprising a nosewheel carrying mounting upon the aircraft, and a generally upright thrust member also upon the aircraft and arranged when in use to be slidable relative to said mounting in the generally upright direction of its own length, between an upper and a lower position, power-operated launching mechanism including a launching member mounted for movement between rear and forward limit positions along the plane of the surface whereon rests the nosewheel of said mounting, a first connecting element disposed at the lower end of and slidable up and down with the vertically movable member, and a second, complemental, connecting element carried by said launching member, arranged to engage the first connecting member from behind when the latter occupies its lower position, below the wheel's rotational axis, but to separate from the first connecting element when the launching member reaches its forward limit position.

2. An aircraft launching system according to claim 1, including releasable locking mechanism operatively interposed between the respective connecting elements, a releasable hold-back device interposed between the movable launching member and a stationary anchorage in position to retain the movable member at the starting end of its launching stroke, and a trip device having one part on the locking mechanism and another, stationary, part co-acting with said one part during the launching stroke.

3. An aircraft launching system according to claim 2, wherein the launching mechanism includes fluid pressure actuated means and the hold-back device includes fluid pressure actuated release means, both said means being operable by the same source of fluid pressure, and said release means being arranged to operate when the fluid pressure rises to a pre-determined pressure sufficient for the launching operation.

4. An aircraft launching system as in claim 1, including means operatively connected to the vertically movable member to hold the same in its lower position during launching, said means being also arranged for operation to shift the vertically movable member after launching into its upper position.

5. An aircraft launching system as in claim 1, including locking means interengageable between the two connecting members during launching, and means automatically operable to release said locking means when the launching member approaches its forward limit position.

6. An aircraft launching system according to claim 5, including an emergency release device operable at will upon the locking means to release the nosewheel mounting from the movable launching member.

7. An aircraft launching system comprising a nosewheel mounting and a power-operated launching member, said nosewheel mounting comprising an upright telescopic leg having upper and lower leg members, an upright member projecting downwardly from the lower leg member below the axis of the nosewheel, a connecting element provided on the lower end of the downwardly projecting member, said connecting element being arranged to receive from behind, in locating engagement therewith the leading portion of said power-operated launching member, and said connecting element being also separable from said leading portion by the time the launching member reaches the end of its launching stroke.

8. An aircraft nosewheel mounting according to claim 7 including a strut connected to the lower leg member at one end and adapted for connection to the aircraft at its other end so as to constitute with the nosewheel mounting a structure capable of sustaining applied launching thrust, a wheel axle member mounted on the lower leg member for rotational steering movement and for axial sliding movement, said axial sliding movement being defined by end stops so arranged such that when the wheel axle member occupies its fully raised position on the lower leg member the lower part of the strut lies within the height of the nosewheel and when the wheel axle member occupies its fully lowered position the lower part of the strut lies clear of the nosewheel whereby the latter can turn with the wheel axle member about the steering axis without obstruction, first motor means operatively interposed between the non-rotative part of the nosewheel mounting and the wheel axle member for turning the latter about the steering axis, and second motor means operatively interposed between the lower leg member and the wheel axle member for moving the wheel axle member along the steering axis between the end stops.

9. An aircraft launching system comprising an aircraft nosewheel mounting including a wheel-carrying member and a thrust member arranged when in use to be relatively slidable in a generally upright direction, a connecting element disposed at the lower end of the thrust member and movable therewith relative to the wheel-carrying member between a lower position and an upper position below the wheel's rotational axis, power-operated launching mechanism including a launching member mounted for movement along the plane of the surface on which the nosewheel runs, and a connecting element provided on the launching member and arranged to enter into locating engagement from behind with the first-mentioned connecting element when the latter occupies its lower position, said connecting elements being separable when the launching member reaches the end of its launching stroke.

References Cited by the Examiner

UNITED STATES PATENTS

| | | | |
|---|---|---|---|
| 1,532,630 | 4/25 | Methlin | 244—63 |
| 2,862,682 | 12/58 | Davies | 244—63 |
| 2,919,933 | 1/60 | Olson | 244—50 X |
| 2,942,805 | 6/60 | Zimmoch | 244—63 |
| 3,062,485 | 11/62 | Hartel | 244—63 |

FOREIGN PATENTS 348,844   5/31   Great Britain.

MILTON BUCHLER, *Primary Examiner.*

ANDREW H. FARRELL, *Examiner.*